United States Patent [19]

Konrad

[11] 4,443,744

[45] Apr. 17, 1984

[54] METHOD AND APPARATUS FOR CHARGE ENHANCEMENT OF A COMMUTATING CAPACITOR

[75] Inventor: Charles E. Konrad, Roanoke, Va.

[73] Assignee: General Electric Company, Salem, Va.

[21] Appl. No.: 453,559

[22] Filed: Dec. 27, 1982

[51] Int. Cl.³ .............................................. H02P 3/08
[52] U.S. Cl. .................................... 318/269; 318/302; 318/345 R; 318/363
[58] Field of Search ...................... 364/424, 424.1, 426; 318/341, 139, 246, 258, 259, 269

[56] References Cited

U.S. PATENT DOCUMENTS

| | | | |
|---|---|---|---|
| 3,492,557 | 1/1970 | Brown | 318/341 |
| 3,624,475 | 11/1971 | Smith | 318/341 |
| 3,667,021 | 5/1972 | Anderson et al. | 318/341 |
| 3,719,876 | 3/1973 | Miller | 318/341 |
| 3,748,560 | 7/1973 | Sawa et al. | 318/341 |
| 3,890,549 | 6/1975 | Konrad | 318/246 |
| 3,927,357 | 12/1975 | Konrad | 318/139 |
| 3,949,284 | 4/1976 | Wright | 318/257 |
| 3,980,934 | 9/1976 | Wright | 318/269 X |
| 3,987,349 | 10/1976 | Shibata et al. | 318/139 X |
| 4,246,519 | 1/1981 | Boxer | 318/139 |

*Primary Examiner*—G. Z. Rubinson
*Assistant Examiner*—Bentsu Ro
*Attorney, Agent, or Firm*—Ormand R. Austin; Arnold E. Renner

[57] ABSTRACT

For protection against commutation failures in a motor control circuit, there is provided a method and apparatus by which the charge on a commutating capacitor is made to track the armature current of a separately excited motor regardless of the operating mode of the motor. In preferred form, a commutating network is provided having a commutating capacitor, a charge reversal thyristor, and a commutating thyristor configured to cause commutation of a main, control thyristor upon sequentially gating the charge reversal thyristor and the commutating thyristor with charge of sufficient magnitude stored on the capacitor. The thyristors of the commutating network are gated according to the operating mode of the motor; thus, there is included a means, or step, for sensing the motor operating mode. In the braking mode, the main thyristor is inhibited while the charge reversal and commutating thyristors are alternately, sequentially gated such that commutating capacitor charge is at all times proportional to the braking current. Upon resuming operation in the motoring mode, there is assurance that capacitor charge is sufficient to prevent commutation failures.

10 Claims, 5 Drawing Figures

METHOD AND APPARATUS FOR CHARGE ENHANCEMENT OF A COMMUTATING CAPACITOR

This invention relates generally to control circuits for direct current traction motors of the type having application to propulsion of an electric vehicle, and more particularly, to such control circuits wherein it is necessary to periodically commutate a thyristor controlling power to the traction motor.

BACKGROUND OF THE INVENTION

The dc electric motor most commonly used to drive an electric vehicle is the series wound motor. There has been, however, considerable recent interest in the shunt-wound motor (or, as it is frequently referred to, the separately excited motor) for these purposes.

For either type of motor, it is, of course, now well known to regulate motor power (i.e., speed and torque) by using solid state thyristor devices in a chopper circuit such that variations in the markspace ratio of the controlled thyristor determine the net effective power applied to the motor. Commonly, the thyristors (silicon controlled rectifiers, or SCRs) are gated into conduction at a periodic rate determined by a gate control circuit responsive to the relative position of an accelerator pedal.

It is characteristic of SCRs that, once they have been gated into conduction, they remain in that state until a zero or reverse polarity has been applied between the anode and cathode terminals, i.e., gate control becomes ineffective. In a dc traction motor control, to turn off, or commutate, the main power controlling thyristor, a commutating capacitor, having a stored reverse voltage in terms of the thyristor, is connected at an appropriate time such that the reverse polarity renders the thyristor non-conducting. Typically, a second control thyristor is gated to discharge the commutating capacitor and carry out the commutation of the main thyristor. When applied to control of a shunt-wound traction motor, however, a unique commutation problem arises, in some instances, upon changing the operating mode of the traction motor.

In that regard, the electric vehicle traction motor may be operated in either a motoring mode, wherein it is desired that the vehicle be propelled along, or in a braking mode, wherein the vehicle is being decelerated. Braking is most generally carried out electrically by reversing direction of the motor in combination with appropriate operation of the accelerator pedal. For a shunt-wound motor, it has been found that a commutation failure may occur whenever the motor is switched to a motoring mode from a braking mode, particularly at such times as the motoring mode preceding the braking mode is characterized by high speed, low torque operation.

A commutation failure in this situation arises as a result of the fact that the charge stored on the commutating capacitor during the motoring mode is insufficient to commutate the relatively high current resulting from the braking operation. When a commutation failure occurs, a line contactor or other device must open the circuit to clear the fault, and then must reclose for normal operation. This causes an undesirable discontinuity in a vehicle's deceleration and produces early deterioration of contactor tips.

Although provision could be made to delay the gating of the controlled thyristor until the braking current decays to a level at which commutation can be assured, this leads to a significant discontinuity in the deceleration profile, producing a drifting feel in the handling characteristics of the vehicle.

Accordingly, it is among the objects of the present invention to provide a commutating circuit and method of operation thereof by which the commutating capacitor charge can be made to track the actual braking current flowing in the motor armature so that transfer from the braking mode to the motoring mode can be accomplished at any level of current without concern for commutation failure.

SUMMARY OF THE INVENTION

The invention provides a method and apparatus by which the charge on a commutating capacitor is made to track the armature current of a separately excited motor regardless of the operating mode of the motor. In preferred form, a commutating network is provided having a commutating capacitor, a charge reversal thyristor, and a commutating thyristor configured to cause commutation of a main control thyristor upon sequentially gating the charge reversal thyristor and the commutating thyristor with charge of sufficient magnitude stored on the capacitor. The thyristors of the commutating network are gated according to the operating mode of the motor; thus, there is included a means, or step, for sensing the motor operating mode. In the braking mode, the main thyristor is inhibited while the charge reversal and commutating thyristors are alternately, sequentially gated such that commutating capacitor charge is at all times proportional to the braking current. Upon resuming operation in the motoring mode, there is assurance that capacitor charge is sufficient to prevent commutation failures.

BRIEF DESCRIPTION OF THE DRAWINGS

While the specification concludes with claims particularly pointing out and distinctly claiming the subject matter regarded as the invention, the invention will be better understood from the following description taken in connection with the accompanying drawings in which:

DETAILED DESCRIPTION OF THE INVENTION

Figure 1:
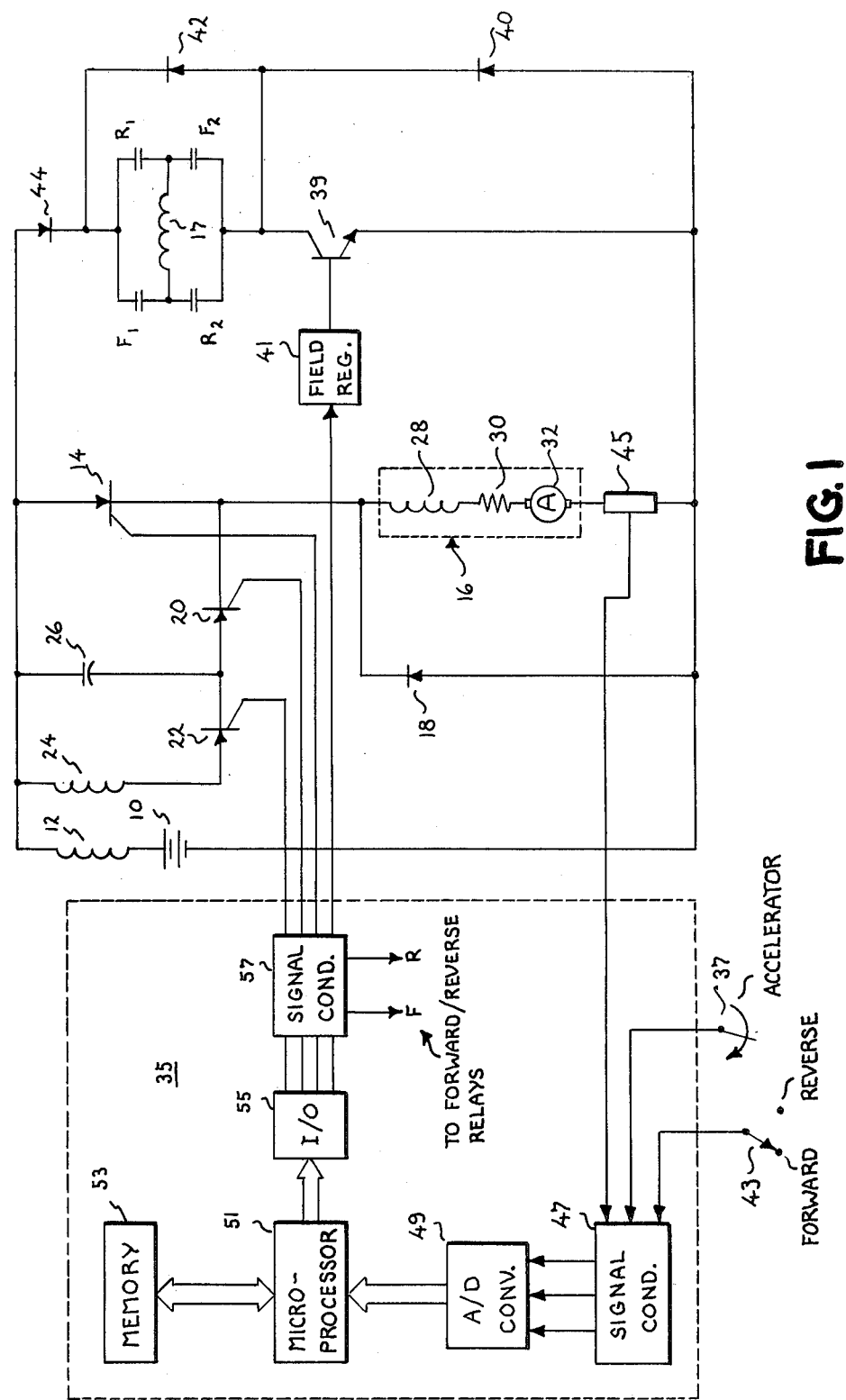
FIG. 1 is a schematic diagram illustrating circuitry for carrying out a preferred form of the invention in conjunction with a shunt-wound motor as applied in a battery powered vehicle.

It will be helpful initially to describe the normal commutating action of the control circuitry of FIG. 1 prior to describing operation according to which the commutating capacitor charge is made to follow the magnitude of armature braking current.

In FIG. 1, a separately excited motor, including armature 16 and field winding 17, is supplied through a main SCR 14 from a battery 10 having an inherent source inductance 12 effectively in series with the battery terminals. Power to the armature 16 is controlled by periodically switching the main SCR on and off such that the ratio of on time to off time determines the effective level of voltage which is applied to the armature 16. During non-conducting periods of SCR 14, current in the armature winding 16 is maintained through the free-wheeling diode 18. To facilitate an understanding of the invention and its operation, armature 16 is illustrated to include the effective armature inductance 28 and the effective series resistance 30, each in series with a counter EMF generator 32.

Capacitor 26, commutating SCR 20, charge reversal SCR 22, and inductor 24 comprise a commutating network for commutating, or turning off, the main thyristor 14. The gate control signals for SCRs 14, 20 and 22 are derived from a microprocessor-based controller 35 (more fully described herein below) and bear a frequency relationship to the position of the vehicle accelerator pedal 37.

The motor field winding 17 is separately excited, also from battery 10. Current from the field winding 17 is controlled in magnitude by transistor 39 via a field regulator 41 as commanded by the microprocessor controller 35; direction of the field excitation current is determined by the relative position (i.e., open or closed) of relay contacts $F_1$, $F_2$, $R_1$ and $R_2$ as commanded by forward/reverse switch 43, acting through the microprocessor controller 35. Actuators for the forward-/reverse relays are not specifically illustrated. A diode 40 is connected in parallel with transistor 39 and serves to protect the transistor 40 from excessive reverse voltages. A flyback, or free-wheeling, diode 42 is connected in a conventional manner across the field winding network. A blocking diode 44 prevents diodes 40 and 42 from shunting current away from source inductance 12 during a commutation cycle. The utility of diode 44 will become more apparent from the ensuing discussion.

In a typical operating cycle, commutating capacitor 26 is charged positive at the top plate (i.e., that plate connected to the anode of SCR 14) and negative at the bottom. A cycle may be considered to be initiated by gating on SCR 14. Current in the armature 16 rises immediately to the value of current which was carried by free-wheeling diode 18 at the moment SCR 14 was gated on. The armature current then rises in linear fashion dependent on the voltage of battery 10 and the armature inductance 28 and resistance 30.

For the commutation process, the voltage stored on the commutating capacitor 26 must be reversed in polarity and then connected directly across SCR 14 by gating SCR 20 into conduction. The charge reversal process is initiated by gating SCR 22 while thyristor 20 is in a non-conductive state. Operation of charge reversal inductor 24 and capacitor 26 then provides resonant reversal of the voltage across commutating capacitor 26. Once the capacitor 26 has been reversibly charged (i.e., positive at the bottom plate; negative at the top), reduction of the reverse potential is prevented by the non-conductive state of SCR 20 and the ability of SCR 22 to block current flow in the reverse direction. With the reverse charge on the commutating capacitor 26, gating SCR 20 into the on state effectively connects the capacitor 26 across the main SCR 14, providing a reverse voltage thereto and forcing it into a blocking state. The armature current is thus commutated.

During the commutation part of the cycle, with thyristor 20 conductive, the voltage across commutating capacitor 26 is in a direction such that it is additive to the battery voltage. Thus, there is a momentary increase in armature current at the beginning of the commutation action. This current flow is from the battery 10, through source inductance 12, capacitance 26, SCR 20, and armature 16 back to the battery 10. This current increases until the voltage across capacitor 26 passes through zero. An overshoot then occurs due to the inductances of the circuit (i.e., armature inductance 30 and source inductance 12) and commutating capacitor 26 begins to charge once again such that the top plate becomes positive. The voltage on capacitor 26 reaches the battery voltage and then increases slightly beyond. This produces a forward bias on free-wheeling diode 18 causing it to become conductive and effectively thereby decoupling the armature 16 from the series loop described above.

At this point, energy stored in the source inductance 12 is recovered to increase the charge on capacitor 26 and produce a voltage thereon which is some value higher than the battery voltage. The peak value of this voltage, $V_{PK}$, is given by:

$$V_{PK} = K\sqrt{L/C} I_{PK} + V_B \quad (1)$$

where
 L is the value of source inductance,
 C is the commutating capacitance,
 $V_B$ is the battery voltage,
 $I_{PK}$ is the armature current occuring at the instant free-wheeling diode 18 begins to conduct, and
 K is a proportionality constant to allow for the effect of distributed resistance in the circuit.

Experience has shown that K is numerically equal to about 0.95.

Following the process described above for reversing the voltage across capacitor 26, the reverse voltage is found to be about 95 percent of the forward peak voltage. That is, $$V_{PKR} = 0.95 V_{PK} \quad (2)$$

This is the value of reverse voltage across capacitor 26 which is then present for commutation of SCR 14.

The magnitude of current, $I_{INT}$, which the commutating network is capable of interrupting is proportional to the size of capacitor 26 and the peak reverse voltage $V_{PKR}$ on the capacitor 26, and is inversely proportional to turnoff time $\Delta t$ of SCR 14. That is, $$I_{INT} = C I_{PKR}/\Delta t \quad (3)$$

Figure 2:
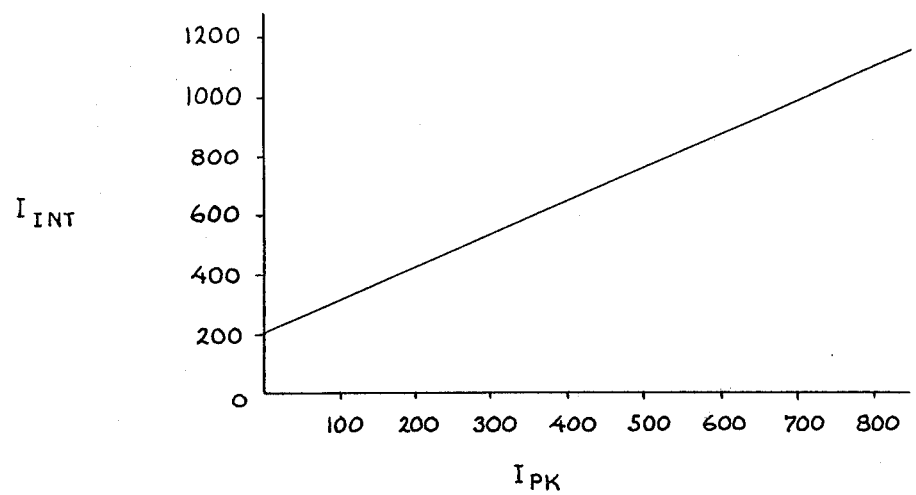
FIG. 2 graphically illustrates the commutation current interrupt capabilities of the circuit of FIG. 1 as a function of the peak current from a previous commutation cycle.

By combining equations (1), (2), and (3), a commutating capability relationship in terms of armature current can be established. FIG. 2 is a plot of current interrupt capability in terms of peak armature current for one example of a control circuit in which L equals 3 microhenrys, C equals 135 microfarads, $\Delta t$ equals 15 microseconds, and $V_B$ equals 24 volts. The important thing to note is that, as the current increases, the circuit operation provides the capability to commutate an even higher current on the next cycle. For example, from FIG. 2, if the current commutated on one pulse is 400 amperes on the next pulse there is a capability of commutating about 700 amperes. Thus, in the circuit of FIG. 1, the energy stored in commutating capacitor 26 tracks the armature current such that there is a margin of safety. Preferably, the size of the commutating capacitor 26 and the minimum turnoff time of SCR 14 are chosen in consideration of the source inductance 12 and the battery voltage to insure that the circuit always operates in a safe and reliable manner.

Preferably, as illustrated in FIG. 1, overall control of the traction motor is under the direction of microprocessor-based controller 35. That is, the signal for gating SCRs 14, 20, and 22 and the control for field winding 17 are derived from a microprocessor-based system which accepts speed and direction command signals from, respectively, an accelerator pedal 37 and a forward/reverse switch 43. It will be recognized, however, that microprocessor control is not in all cases necessary for practicing the invention and that other means may be used for providing appropriate control.

In FIG. 1, input signals from accelerator pedal 37, forward/reverse switch 43, and armature current sensor 45 are applied to a signal conditioner 47, of conventional design, for filtering and scaling the input signals so that they are in form compatible for subsequent processing. The conditioned signals are then passed to an analog to digital converter 49 and then to a microprocessor 51. A memory unit 53 includes random access memory (RAM) and read only memory (ROM) sufficient for program storage and storage of intermediate and computed or monitored variables. A suitable microprocessor is the Model 6502 available from Rockwell International Corp.; the analog to digital converter 49 may, for example, be a type ADC0816 from National Semiconductor, Inc.; and Intel Corp. types 2114 and 2716 memory units are suitable for RAM and ROM, respectively.

Command signals developed by the microprocessor 51 are coupled through an input/output (I/O) interface 55 and an output signal conditioner 57 to SCRs 14, 20 and 22 and to the field regulator 41. The signal conditioner 57 is of conventional design and commprises driver amplifiers responsive to the digital signals from the microprocessor to provide the SCR gating signals and a control signal for regulating the current through field winding 17. The I/O interface 55 may be a type 6520 device available commercially from Rockwell International Corp.

In the motoring mode, the time ratio control of SCR 14 provides means for regulating motor speed. When motor braking is desired, the main thyristor 14 is maintained in a non-conductive state and polarity is reversed on field winding 17. Under these conditions the armature 16 generates a counter EMF in a direction that causes diode 18 to become conductive, effectively short-circuiting the armature 16. Braking torque developed by the motor is proportional to the product of armature current (i.e., the current in diode 18) and field flux. Since the field flux must be maintained at a low value to maintain the counter EMF low, a very large current is required in the armature 16 to provide a reasonable level of braking effort.

During a braking period, shortly before the motor reaches zero speed, the counter EMF will no longer be capable of supporting the necessary current in diode 18 and operation must be reverted to the motoring mode. However, in returning to the motoring mode a problem arises if the motor had been operating at a high rate of speed and at relatively low torque before the onset of braking. The problem is unique to operation with a shunt-wound motor.

Under the conditions just described (i.e., low torque, high speed), the voltage stored on commutating capacitor 26 may be at a low level close to battery voltage. In returning to the motoring mode, toward the end of the braking interval, the current in the free-wheeling diode 18 and in the armature 16 may be quite high, e.g., 700 to 800 amperes. In the motoring mode, once SCR 14 is gated on, the current which passes, rapidly rises to the level of the current already flowing in armature 16. This current may be in excess of that which can be commutated with the voltage which exists on capacitor 26 from the previous motoring operation. The result is that commutation failure occurs.

To assure that transfer of control from the braking mode to the motoring mode can occur at the high levels of current arising from the braking operation, the voltage on capacitor 26 is made to track the actual braking current flowing in the armature 16 regardless of the operating mode.

During the braking mode, battery 10, source inductance 12, armature 16, free-wheeling diode 18, and the commutating network remain in the same circuit relationship as that previously described. However, the main thyristor 14 is not triggered in the braking mode and is held in a non-conducting state. The commutating thyristor 20 and charge reversal thyristor 22 continue to be triggered.

Figure 3:
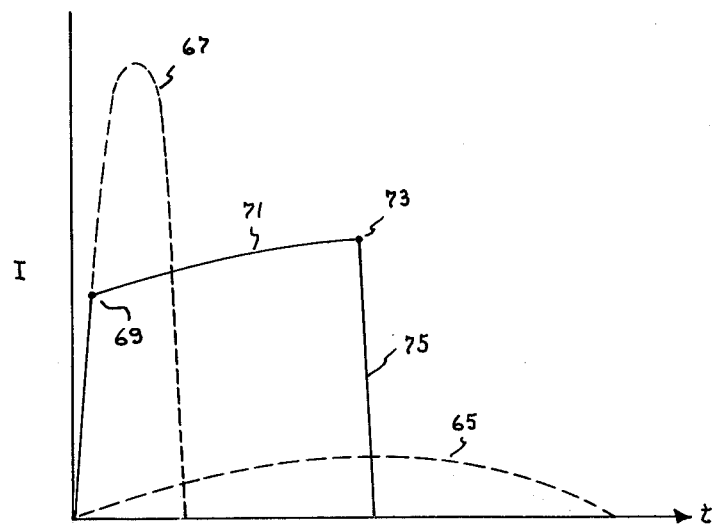
FIG. 3 is a graphical illustration of armature and commutating capacitor current flow achieved when operating according to the invention.

Two possibilities exist for armature current flow upon firing the commutating SCR 20 in the braking mode, depending upon whether diode 18 has decoupled the armature 16 from the circuit or not. FIG. 3 illustrates the armature current flow possibilities in the braking mode. In the first case, the peak magnitude of the current is determined by the commutating capacitor 26, the armature inductance 28, the source inductance 12, and the magnitude of the initial voltage stored on commutating capacitor 26. Curve 65 illustrates the resulting current flow with respect to time for this circuit which is under-damped.

On the other hand, with the armature 16 decoupled from the circuit by diode 18, the circuit remains under-damped since the armature inductance and resistance are effectively removed from the circuit, but the time constant is much shorter. Curve 67 of FIG. 3 illustrates the resulting current with respect to time for these conditions. For a 24 volt battery, a commutating capacitor of 135 microfarads, a source inductance of three microhenrys, and an armature inductance of 300 microhenrys, it can be shown that the peak current for the circuit with the shorter time constant increases by about 10 to 1 over the current under the longer time constant conditions, e.g., from about 16 amperes to about 160 amperes.

In operation, at the time commutating SCR 20 is gated, some initial current is already flowing in the armature 16. The commutating capacitor current then begins to increase along curve 67 until the current reaches the existing armature current value. This corresponds to point 69 on the curve. The current must then begin to increase along curve 71 as determined essentially by the armature inductance 28 and the commutating capacitor 26 of FIG. 1. This current will increase until the voltage on commutating capacitor 26 has passed through zero and reached battery voltage in the opposite polarity, i.e., positive at the top plate. Current flow in the series loop (including the commutating capacitor) at this time corresponds to point 73 of the curves of FIG. 3. From this point the current then rapidly decays at a rate again determined essentially only by the source inductance 12 and the commutating capacitor 26. The energy stored in the armature inductance 28 does not contribute during the decay portion 75 of the curve since the voltage generated is of such polarity that it is shunted by diode 18. The overshoot voltage which occurs on commutating capacitor 26 is determined by the magnitude of current flowing at point 73 - the braking current flowing in the motor armature at that point in time. The overshoot voltage again is essentially given by equation (1). The peak current is the braking current flowing when the commutation SCR 20 is fired. Thus, the voltage stored on the commutating capacitor 26 is made to track the braking current so that transfer can safely be made to the motoring mode at any point in time. That is, there is assurance that the armature current will be commutated on the first attempt upon entering the motoring mode regardless of the torque and speed conditions which preceded the braking mode of operation.

Figure 4:
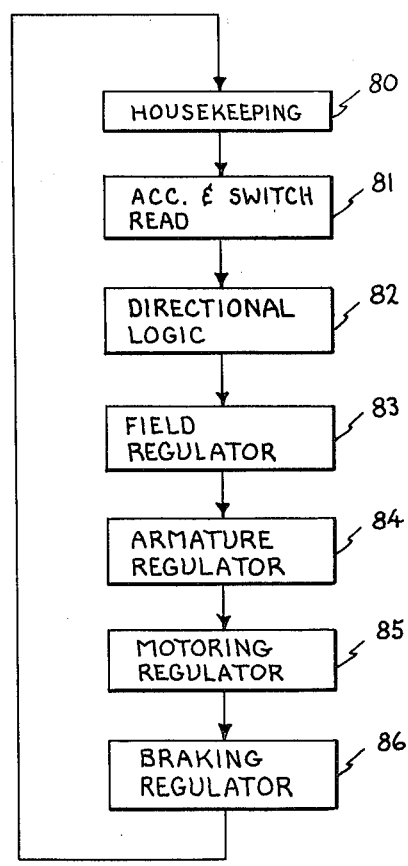
FIG. 4 is a flow chart for an executive program for carrying out the invention in conjunction with a microprocessor-based controller as shown in FIG. 1.

FIG. 4 is a flow chart for an executive program suitable for carrying out the invention in conjunction with the microprocessor-based controller 35 of FIG. 1. The first three routines (housekeeping 80, accelerator and switch read routine 81, and directional logic routine 82) are always scheduled; the last four routines (field regulator 83, armature regulator 84, motoring regulator 85, and braking regulator 86) are scheduled as requested and are activated by flags imbedded in the routines. The braking regulator routine 86 and the armature regulator routine 84 are the routines of principal concern to the present invention. However, it will be helpful to an understanding of the invention to briefly outline the functions of the other routines insofar as they bear upon the present invention.

Thus, housekeeping routine 80 is a general routine necessary for initiating and setting up the overall program. Accelerator and switch read routine 81 is for the purpose of acquiring data regarding the status of the vehicle under control. This routine provides for reading the states, for example, of the vehicle on-off switch, of the forward/reverse switch, and the brake and accelerator positions, etc. Directional logic routine 82 determines (from data acquired in routine 81) the operational status of the vehicle; e.g., whether it is in a forward motoring mode, etc., and prevents transitions from one mode of operation to another which might be either damaging to the vehicle or which would result in less than optimum performance. The field regulator routine 83 generates a signal according to which field current of the motor is regulated. This signal, ultimately in analog form, is applied to the field regulator 41 of FIG. 1. The armature regulator 84 generates appropriately timed signals for gating SCRs 14, 20, and 22 of FIG. 1 depending on the mode of operation. Motoring regulator routine 85 responds to changes in accelerator position to develop current reference signals for the armature current regulator and for the field regulator.

The braking regulator routine 86 provides a current regulation function interacting with field regulator routine 83 to regulate the field winding in the braking mode. This routine 86 also provides the basic logic functions which are pertinent to the invention in its preferred form of FIG. 1. This logic is set forth in the flow diagram of FIG. 5.

Figure 5:
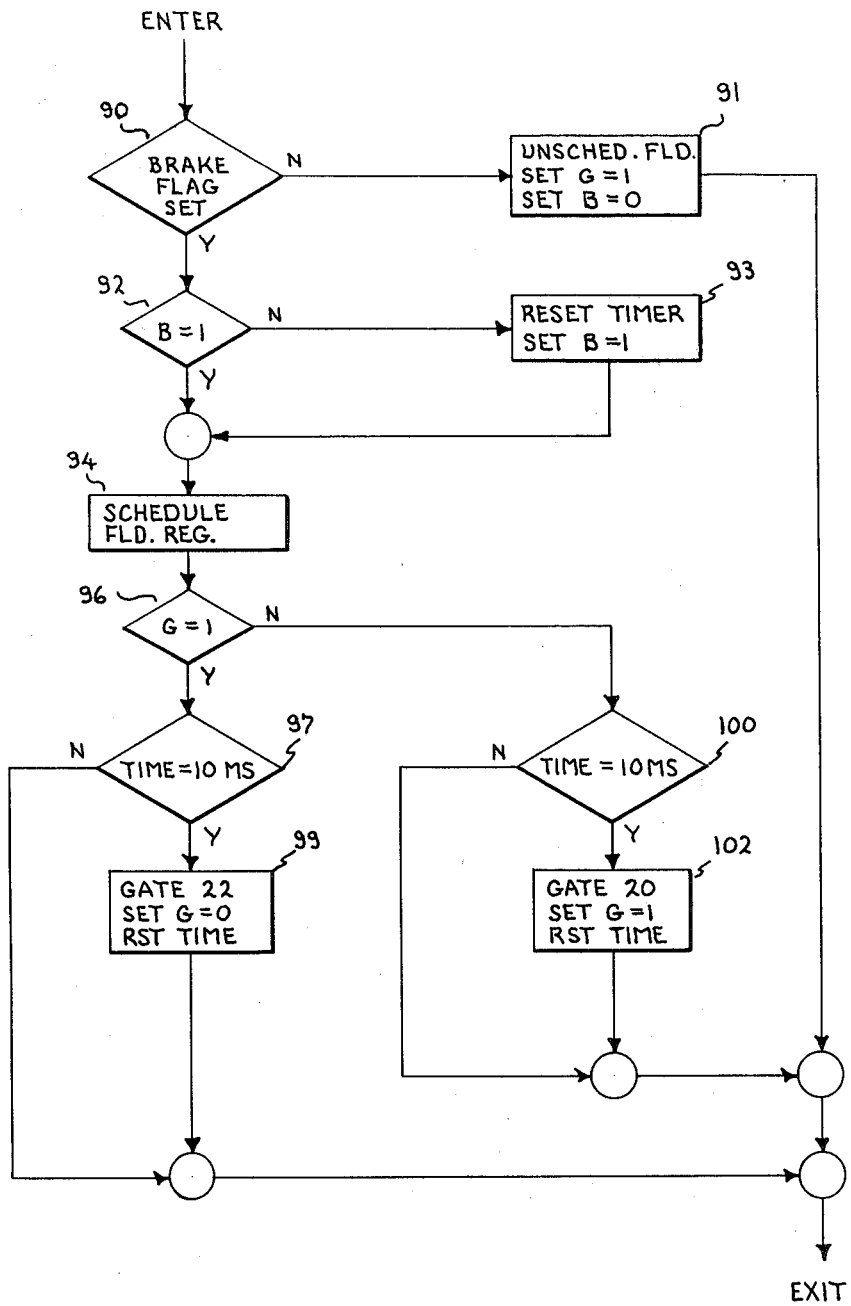
FIG. 5 is a logic flow chart illustrating logic functions pertinent to the invention in its preferred form of FIG. 1.

The logical operations of FIG. 5 are carried out by the program (for microprocessor 51 of FIG. 1) on a regular, repeated time schedule. This may, for example, be once every millisecond. Upon entering the logic subroutine, a decision is first made (decision block 90) as to whether operation is in the braking mode or not. If not, the field regulator, effective in the braking mode, is unscheduled (i.e., it will not be called upon) and flags B and G are set, respectively, to one and zero by logic operation 91. The subroutine is then exited. If the result of decision block 90 is yes, then decision block 92 determines whether B is one or zero. When B equals zero, this is an indication that the current pass is the first pass through the logic operation and a signal to reset a timer is given. Simultaneously, B is set equal to one in logic operation 93. The timer is not specifically illustrated but may, for example, be a conventional software timer which counts out at some preselected time. As will be more fully explained hereinbelow, the timing value determines the firing rate of SCRs 20 and 22 of FIG. 1 when operation is in the braking mode. In the event that B equals one, field regulation for the braking mode of operation is then scheduled by carrying out logic operation 94.

Next, the value of G is tested in decisional block 96. Decision block 96 is effective to toggle back and forth between its two output paths at the end of every timed out period. As illustrated, and for this example, that period is every 10 milliseconds. If G equals one, the time on the timer is checked at decisional point 97. If the time period has expired, logic operation 99 is carried out. This operation is effective to trigger the charge reversal SCR 22 of FIG. 1. Also, substantially simultaneously, the G flag is reset to zero and the timer is reset to zero. If the timer has not timed out, the subroutine is exited to be picked up on the next pass through the main program.

If, on the other hand, G equals zero at decisional point 96, the timer is also checked at decisional point 100. Again, if the timer has not timed out, the subroutine is simply exited and return is to the main program. If the timer has timed out, however, (e.g., to 10 milliseconds) then logic operation 102 is carried out. Logic operation 102 is effective to trigger the commutating SCR 20 starting the sequence described above for building up a charge on the commutating capacitor 26 which is proportional to the braking current. Finally, logic operation 102 causes G to be set to one and the timer to be reset.

It can be seen from the logic of FIG. 5 that SCRs 20 and 22 are alternately triggered during the braking mode as decisional step 96 is effective to cause one SCR to fire and then the other. For the example illustrated, each SCR is triggered every 10 milliseconds. This time is sufficient to allow the charge reversal action to occur on commutating capacitor 26, and for SCRs 20 and 22 to become selfcommutating by the back bias which results on each following a conduction period.

From the foregoing it will be appreciated that a method and apparatus have been described which are effective to enhance the charge buildup on a commutating capacitor as used for commutating the armature current of a shunt-wound traction motor. The invention is especially useful in that it insures that commutation will be successful in a motoring mode of operation following a braking mode which was preceded by motoring operation characterized by high speed and low torque.

Thus, while there has been shown and described what is considered a preferred embodiment of the invention, it is understood that various other modifications may be made therein. It is intended to claim all such modifications which fall within the true spirit and scope of the present invention.

The invention claimed is:

1. For use with a control thyristor adapted to control power to a separately excited motor operable in a motoring mode and in a braking mode, a method for assuring commutation of the thyristor following return of motor operation to a motoring mode from a braking mode, said method comprising the steps of:
   (a) providing a commutating network including a commutating capacitor, a commutating thyristor, and a charge reversal thyristor arranged such that an electrical charge of sufficient magnitude stored on the commutating capacitor will cause commutation of said control thyristor following a sequential gating of said charge reversal thyristor and said commutating thyristor;
   (b) sensing whether the motor is operating in the braking mode;
   (c) maintaining the control thyristor in a nonconducting state during the braking mode of operation; and
   (d) alternately gating the commutating and charge reversal thyristors into a conduction state during the braking mode to cause the electrical charge acquired by the commutating capacitor to track the electrical current drawn by the motor in the braking mode, such charge being sufficient to assure commutation of the control thyristor upon the motor resuming operation in the motoring mode.

2. The method of claim 1 wherein the commutating and change reversal thyristors are gated at equal time intervals during the braking mode of operation.

3. The method of claim 2 further including the step of providing a free-wheeling diode in a parallel relationship with the armature winding of the motor, said diode being connected to decouple the armature winding during operation in the braking mode so that the commutating capacitor is charged in a shorter time-constant circuit.

4. The method of claim 3 further including the step of regulating current flow in the field winding of the motor during operation in the braking mode.

5. In a control circuit for a separately excited motor including a control thyristor for regulating power to the motor, apparatus for commutating the control thyristor, such apparatus being especially effective to commutate said thyristor following return of motor operation to a motoring mode from a braking mode, such apparatus comprising:
   (a) a commutating network including a commutating capacitor, a commutating thyristor, and a charge reversal thyristor arranged such that an electrical charge of sufficient magnitude stored on the commutating capacitor will cause commutation of said control thyristor following sequential gating of said charge reversal thyristor and said commutating thyristor;
   (b) means for determining motor operating mode;
   (c) means for maintaining the control thyristor in a non-conducting state whenever the motor is being operated in a braking mode;
   (d) means for alternately gating the commutating and charge reversal thyristors into a conduction state during the braking mode so that the electrical charge acquired by the commutating capacitor in the braking mode is proportional to the electrical current flow in the motor, such charge being sufficient to assure commutation of the control thyristor upon the motor becoming operative in the motoring mode.

6. The apparatus of claim 5 wherein the commutating capacitor is arranged to be connected electrically in parallel with the control thyristor whenever the commutating thyristor is in a conducting state.

7. The apparatus of claim 6 wherein said means for determining the motor operating mode, said means for maintaining the control thyristor in a nonconducting state, and said means for alternately gating the commutating and charge reversal thyristor comprise: a microprocessor-based controller having a memory unit for storing data and a program of operation, means for receiving and conditioning signals indicative of actual and desired motor operating conditions, and means for providing output signals according to which said control thyristor, said charge reversal thyristor, and said commutating thyristor are gated into a conduction state.

8. The apparatus of claim 7 wherein said microprocessor-based controller is operative to gate said charge reversal thyristor and said commutating capacitor into conduction upon equally spaced-apart time intervals.

9. The apparatus of claim 8 wherein said commutating network includes an inductor.

10. The apparatus of claim 9 further including a free-wheeling diode connected in parallel with the armature of the motor in a direction to decouple armature inductance during the braking mode of operation, for allowing the commutating capacitor to become charged in a shorter time-constant circuit.

* * * * *